US012735286B2

(12) United States Patent
Noguchi

(10) Patent No.: US 12,735,286 B2
(45) Date of Patent: Sep. 15, 2026

(54) SHEET CONVEYANCE DEVICE

(71) Applicant: RISO KAGAKU CORPORATION, Tokyo (JP)

(72) Inventor: Yoshihiro Noguchi, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 19/071,172

(22) Filed: Mar. 5, 2025

(65) Prior Publication Data

US 2025/0289677 A1 Sep. 18, 2025

(30) Foreign Application Priority Data

Mar. 14, 2024 (JP) ................................ 2024-040106
Dec. 9, 2024 (JP) ................................ 2024-214302

(51) Int. Cl.

*B65H 5/36* (2006.01)
*B41J 11/44* (2006.01)
*B65H 5/06* (2006.01)
*B65H 7/06* (2006.01)

(Continued)

(52) U.S. Cl.

CPC .............. *B65H 9/002* (2013.01); *B41J 11/44* (2013.01); *B65H 5/062* (2013.01); *B65H 7/06* (2013.01); *B65H 9/20* (2013.01); *B65H 2301/331* (2013.01); *B65H 2301/44318* (2013.01); *B65H 2404/2613* (2013.01); *B65H 2601/272* (2013.01); *B65H 2801/12* (2013.01); *B65H 2801/15* (2013.01)

(58) Field of Classification Search

CPC . B65H 9/002; B65H 9/20; B65H 5/36; B65H 5/062; B65H 5/06; B65H 2301/331; B65H 2301/44318; B65H 2404/2613; B65H 3/66; G03G 15/6567

See application file for complete search history.

(56) References Cited

U.S. PATENT DOCUMENTS 6,494,451 B2 * 12/2002 Michel .................. B65H 5/062 271/274
8,616,544 B2 * 12/2013 Katayama ................ B65H 7/02 271/109

(Continued)

FOREIGN PATENT DOCUMENTS

JP 4-144859 A 5/1992
JP 4-153149 A 5/1992
JP 6-234441 A 8/1994

(Continued)

OTHER PUBLICATIONS

Machine Translation of JP 2009-292598 A (Year: 2026).*

*Primary Examiner* — Luis A Gonzalez
(74) *Attorney, Agent, or Firm* — GREENBLUM & BERNSTEIN, P.L.C.

(57) ABSTRACT

A sheet conveyance device comprises: a skew detector that detects a skewed amount with respect to a conveyance direction of a sheet to be conveyed; and a skew corrector that corrects skew feeding of the sheet, and the skew corrector includes a guide member that supports the sheet along a width direction, and displaces the guide member so as to rotate a region in the width direction of the sheet supported by the guide member about an axis parallel to a conveyance direction according to a skewed amount of the sheet.

3 Claims, 8 Drawing Sheets

(51) Int. Cl.
*B65H 9/00* (2006.01)
*B65H 9/20* (2006.01)

(56) References Cited

U.S. PATENT DOCUMENTS

| | | | | |
|---|---|---|---|---|
| 8,910,941 | B2 * | 12/2014 | Jacobs | B65H 5/062 271/274 |
| 2006/0261540 | A1 * | 11/2006 | Loiselle | B65H 7/08 271/228 |

FOREIGN PATENT DOCUMENTS

| | | | | |
|---|---|---|---|---|
| JP | 10-35910 | A | | 2/1998 |
| JP | 2009292598 | A | * | 12/2009 |

* cited by examiner

SHEET CONVEYANCE DEVICE

CROSS-REFERENCE TO RELATED APPLICATION

This application is based upon and claims the benefit of priority of the prior Japanese Patent Application No. 2024-040106 filed on Mar. 14, 2024 and the prior Japanese Patent Application No. 2024-214302 filed on Dec. 9, 2024, the entire contents of which are incorporated herein by reference.

FIELD

Embodiments discussed herein are related to a sheet conveyance device.

BACKGROUND

An image forming device that forms an image on a sheet-like recording medium (hereinafter, referred to as a sheet) separates sheets one by one and supplies the sheets to an image forming unit, and the image forming unit forms an image on the sheets. A conveyance mechanism that conveys a sheet in an image forming device includes a sheet feeder that conveys a sheet before image formation to the image forming unit. When an image formation start instruction is input to the image forming device, the sheet feeder causes a separation conveyance unit to separate the sheets one by one, and sequentially conveys each sheet to the image forming unit.

When the sheet is conveyed in a skewed state in which a sheet is tilted with respect to the normal conveyance direction at the time of conveying the sheet to the image forming unit by the sheet feeder, problems such as deterioration in image quality (misalignment of the image on the sheet, protrusion of the image from the sheet, and the like) formed on the sheet in the image forming unit and conveyance failure of the sheet may occur. As a countermeasure, in the sheet feeder, a skew correction conveyance unit is provided between the separation conveyance unit and the image forming unit, the skew feeding of the sheet conveyed from the separation conveyance unit is corrected by the skew correction conveyance unit in accordance with the timing of image forming, and then the sheet is supplied to the image forming unit.

For example, a skew correction conveyance unit disclosed in Japanese Patent Laid-Open Publication No. H10-35910 includes a register roller capable of selecting a rotation operation state and a rotation stop state, and corrects skew feeding by causing a leading end of a sheet to abut against the register roller in the rotation stop state to slack the sheet. The register roller is rotated at a predetermined timing to convey the sheet after skew correction to the image forming unit.

Since the register roller corrects skew feeding of the sheet while repeating the rotation and stop cycles, in a case where the number of times of conveyance of the sheet per unit time increases, it becomes difficult to satisfy the required performance of the operation due to physical factors such as the influence of rotational inertia. For example, when the register roller is repeatedly rotated and stopped at very short intervals, the register roller is rotated or stopped at a timing deviated from the input of the actual rotation instruction or stop instruction, and the positional accuracy of image formation on the sheet conveyed from the register roller to the image forming unit deteriorates. For this reason, the skew correction conveyance unit in the form of repeating the cycle of rotation and stop of the register roller has a limit of the operation speed for which the conveyance accuracy can be secured, and the skew correction conveyance unit is a factor of limiting the speed improvement of the sheet conveyance (the number of image formation sheets per unit time).

In order to prevent the skew correction conveyance unit from becoming a bottleneck with respect to the conveyance speed of the sheet, a technique for increasing the operation speed of the sheet feeder has been proposed. For example, in the invention described in Japanese Patent Laid-Open Publication No. H6-234441, a pair of conveyance rollers as a pair of register rollers is configured to be capable of changing an angle along a sheet conveyance direction (thrust direction). Then, the skewed amount is detected by the sensor during the conveyance of the sheet, the angle of the pair of conveyance rollers is changed until the nip line of the pair of conveyance rollers becomes parallel to the leading end of the sheet, and when the sheet is nipped by the pair of conveyance rollers, the angle of the pair of conveyance rollers is returned to a right angle with respect to the conveyance direction. The skew feeding of the sheet is corrected by the operation of the pair of conveyance rollers. An invention similar to Japanese Patent Laid-Open Publication No. H6-234441 is disclosed in Japanese Patent Laid-Open Publication No. H4-153149.

In the invention described in Japanese Patent Laid-Open Publication No. H4-144859, the skew feeding of the sheet is corrected by giving different rotation speeds to each of the two conveyance rollers arranged in parallel in the conveyance direction according to the detected skewed amount of the sheet.

In the configuration in which the skew feeding of the sheet is corrected by changing the angle of the pair of conveyance rollers along the conveyance direction of the sheet as in Japanese Patent Laid-Open Publication No. H6-234441, a large space is required in the conveyance direction in order to arrange the skew correction conveyance unit, and the conveyance path of the sheet becomes long. As a result, the image forming device increases in size in the conveyance direction.

In the configuration in which the skew feeding of the sheet is corrected by providing the speed difference between the two conveyance rollers as in Japanese Patent Laid-Open Publication No. H4-144859, there is a possibility that the sheet is distorted by the speed difference between the two conveyance rollers, and there is a problem that it is difficult to appropriately control the operation of the conveyance rollers in consideration of the rigidity of the sheet, the friction coefficient of the conveyance rollers, and the like.

Such a problem exists not only in an image forming device that forms an image on a sheet but also in various sheet conveyance devices that convey a sheet-like conveyance object (hereinafter, referred to as a sheet). That is, in the conventional sheet conveyance device, when correcting skew feeding of the sheet with respect to the conveyance direction, it is difficult to improve the conveying speed without causing an increase in size in the conveyance direction and a conveyance failure of the sheet.

SUMMARY

In one aspect, a sheet conveyance device comprises: a skew detector that detects a skewed amount with respect to a conveyance direction of a sheet to be conveyed; and a skew corrector that corrects skew feeding of the sheet, and the skew corrector includes a guide member that supports the sheet along a width direction, and displaces the guide member so as to rotate a region in the width direction of the sheet supported by the guide member about an axis parallel to a conveyance direction according to a skewed amount of the sheet detected by the skew detector.

An object and advantages of the invention will be realized and attained by means of the elements and combinations particularly pointed out in the claims.

DETAILED DESCRIPTION

Figure 1:
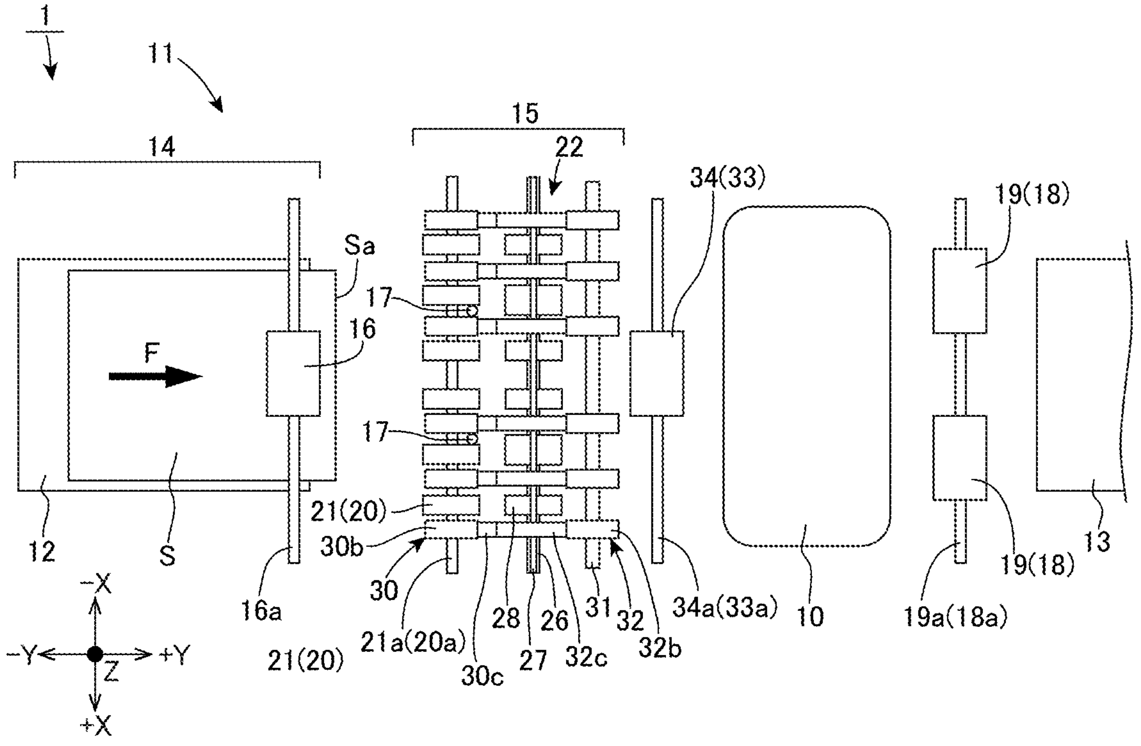
FIG. 1 is a plan view of an image forming device according to an embodiment.
Figure 2:
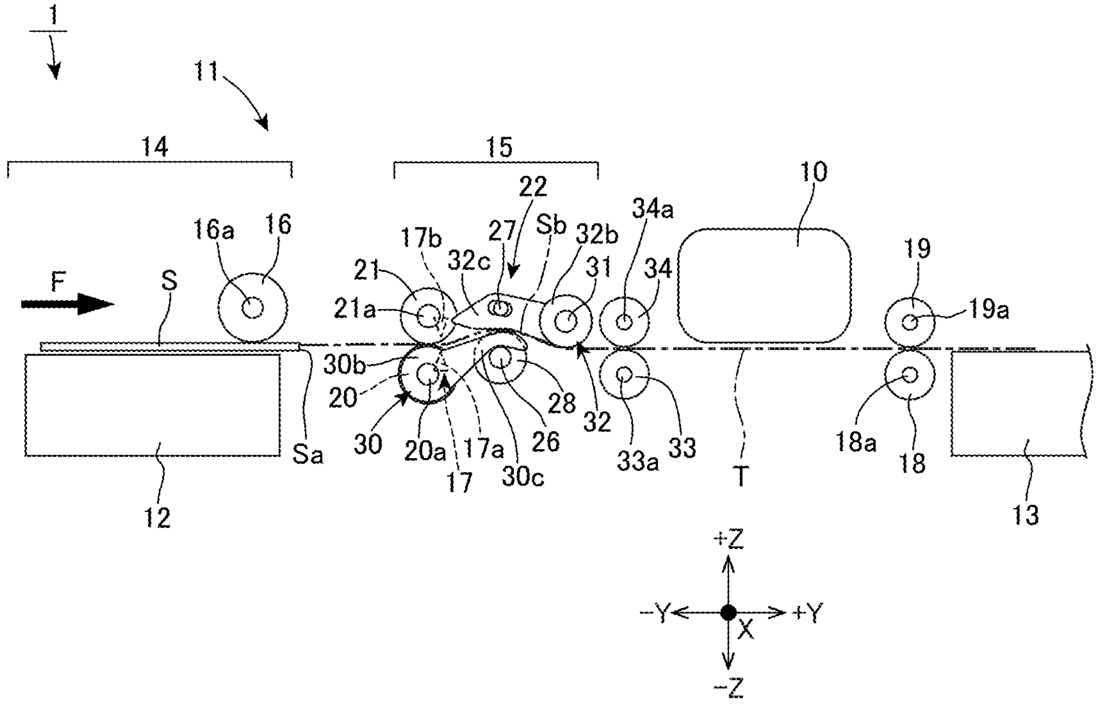
FIG. 2 is a side view of the image forming device.

FIGS. 1 and 2 illustrate a schematic structure of an image forming device 1 according to an embodiment of the present invention. An X-axis direction, a Y-axis direction, and a Z-axis direction in the image forming device 1 are directions perpendicular to each other. The Z-axis direction is a vertical direction, and a +Z-direction side is an upper side and a −Z-direction side is a lower side.

The image forming device 1 is a device that supplies a sheet S, which is a sheet-like image forming medium, to an image forming unit 10 and forms an image on a surface of the sheet S by the image forming unit 10. The image forming unit 10 is, for example, an inkjet printing head or the like that ejects ink onto the sheet S to perform printing.

Figure 3:
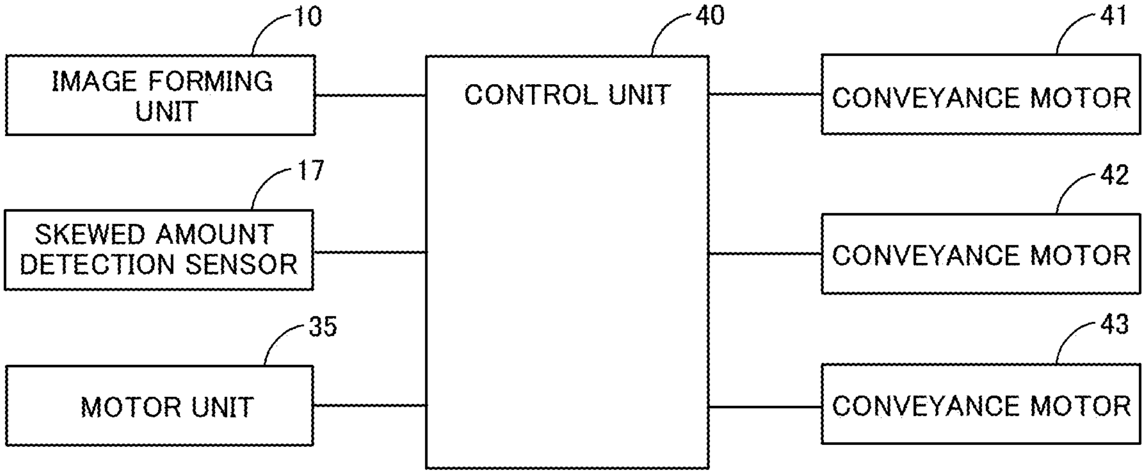
FIG. 3 is a diagram illustrating a control system of the image forming device.

FIG. 3 illustrates a control system of the image forming device 1. The image forming device 1 includes a control unit 40, and operations such as conveyance of the sheet S and image formation on the sheet S described below are performed under the control of the control unit 40.

The image forming device 1 includes a sheet conveyance device 11 that conveys the sheet S. The width direction of the sheet S when conveyed by the sheet conveyance device 11 is the X-axis direction. The sheet conveyance device 11 conveys the sheet S from a sheet feeding unit 12 disposed on the −Y direction side of the image forming unit 10 toward a sheet ejecting unit 13 disposed on the +Y direction side of the image forming unit 10. That is, the sheet conveyance device 11 conveys the sheet S in a conveyance direction F from the −Y direction side which is an upstream side to the +Y direction side which is a downstream side. A path through which the sheet S passes when the sheet S is conveyed by the sheet conveyance device 11 is defined as a conveyance path T (see FIGS. 2 and 7).

The sheet conveyance device 11 includes a sheet feeder that conveys the sheet S before image formation from the sheet feeding unit 12 to the image forming unit 10, and a sheet ejector that conveys the sheet S after image formation from the image forming unit 10 to the sheet ejecting unit 13.

The sheet feeding unit 12 includes a sheet feeding tray or the like that can accommodate a plurality of sheets S stacked in the Z-axis direction. The sheet feeder of the sheet conveyance device 11 includes a separation conveyance unit 14 that separates the sheets S stacked in the sheet feeding unit 12 one by one and conveys the sheets S toward the image forming unit 10, and a skew correction unit 15 that corrects skew feeding of the sheet S conveyed from the sheet feeding unit 12 toward the image forming unit 10.

The separation conveyance unit 14 includes a conveyance roller 16. The conveyance roller 16 is rotatably supported via a shaft member 16*a* extending in the X-axis direction, and is rotationally driven by a conveyance motor 41 (see FIG. 3). By bringing the conveyance roller 16 into contact with an upper surface of an uppermost part of the sheets S stacked on the sheet feeding unit 12 and rotating the conveyance roller 16 in the counterclockwise direction as shown in FIG. 2, one sheet S at the uppermost part is separated and moved in the conveyance direction F.

The skew feeding of the sheet S conveyed one by one by the operation of the conveyance roller 16 is corrected by the skew correction unit 15 which is a skew corrector. The skew feeding of the sheet S indicates that the sheet S travels in a state where the direction of the sheet S is tilted with respect to the conveyance direction F in top view as illustrated in FIG. 1. For example, in a state where a sheet end Sa on the leading end side in the conveyance direction F is parallel to the X-axis direction (orthogonal to the Y-axis direction), the sheet S is not skewed. The state in which the sheet end Sa is not parallel to the X-axis direction is the skewed state of the sheet S.

The skew correction unit 15 includes a pair of skewed amount detection sensors 17 which is a skew detector. As illustrated in FIG. 1, the skewed amount detection sensors 17 are provided at two locations separated from each other in the X-axis direction. As illustrated in FIG. 2, each of the skewed amount detection sensors 17 is a photosensor including a light projecting unit 17*a* and a light receiving unit 17*b* facing each other across the conveyance path T in the Z-axis direction, and receives by the light receiving unit 17*b* the light projected by the light projecting unit 17*a*. The passage of the sheet end Sa of the sheet S is detected when light projected by the light projecting unit 17*a* is blocked by the sheet S.

In a state where the sheet S is not skewed with respect to the conveyance direction F, detection timings of the skewed amount detection sensors 17 placed at two locations coincide with each other. In a state where the sheet S is skewed with respect to the conveyance direction F, detection timings of the skewed amount detection sensors 17 at two locations are different, and the control unit 40 calculates the skewed amount of the sheet S based on a difference between the detection timings. The skew amount of the sheet S calculated by the control unit 40 includes information on which direction the sheet end Sa is tilted with respect to the X-axis direction and information on the tilt angle of the sheet end Sa with respect to the X-axis direction. When the skewed amount detection sensors 17 detect that the sheet S is skewed, the control unit 40 allows the skew correction unit 15 to perform an operation of correcting the skew feeding. Details of the skew feeding correction by the skew correction unit 15 will be described later.

When the sheet S is conveyed to below the image forming unit 10 by the sheet feeder, the image forming unit 10 operates at a predetermined timing, and an image is formed on the sheet S by the image forming unit 10. Note that a lower conveyance mechanism (not illustrated) that conveys the sheet S while adsorbing and holding the sheet S may be provided at a position on a side (−Z direction side) opposite to the image forming unit 10 across the conveyance path T.

The sheet ejector of the sheet conveyance device 11 is disposed on the +Y direction side of the image forming unit 10, and includes a pair of conveyance roller 18 and conveyance roller 19 respectively disposed on the −Z direction side and the +Z direction side with the conveyance path T interposed therebetween. The conveyance roller 18 and the conveyance roller 19 are respectively rotatably supported via a shaft member 18*a* and a shaft member 19*a* extending in the X-axis direction. The conveyance roller 18 is rotationally driven by a conveyance motor 42 (see FIG. 3). The shaft member 19*a* supporting the conveyance roller 19 is supported so as to be movable in the Z-axis direction, and is biased in a direction in which the conveyance roller 19 is brought into contact with the conveyance roller 18. By rotating the conveyance roller 18 in the clockwise direction as shown in FIG. 2 in a state where the sheet S is nipped between the conveyance roller 18 and the conveyance roller 19, the sheet S after image formation is moved in the conveyance direction F to reach the sheet ejecting unit 13.

Next, details of the skew correction unit 15 will be described. FIGS. 4 to 12 illustrate the configuration and operation of the skew correction unit 15. The skew correction unit 15 includes a pair of conveyance roller 20 and conveyance roller 21 respectively arranged on the −Z direction side and the +Z direction side with the conveyance path T interposed therebetween. The conveyance roller 20 and the conveyance roller 21 are respectively rotatably supported via a shaft member 20*a* and a shaft member 21*a* extending in the X-axis direction. The conveyance roller 20 is rotationally driven by a conveyance motor 43 (see FIG. 3). The shaft member 21*a* supporting the conveyance roller 21 is supported so as to be movable in the Z-axis direction, and is biased in a direction in which the conveyance roller 21 is brought into contact with the conveyance roller 20. The sheet S is moved in the conveyance direction F by rotating the conveyance roller 20 in the clockwise direction as shown in FIGS. 2 and 7 in a state where the sheet S is nipped between the conveyance roller 20 and the conveyance roller 21.

Figure 4:
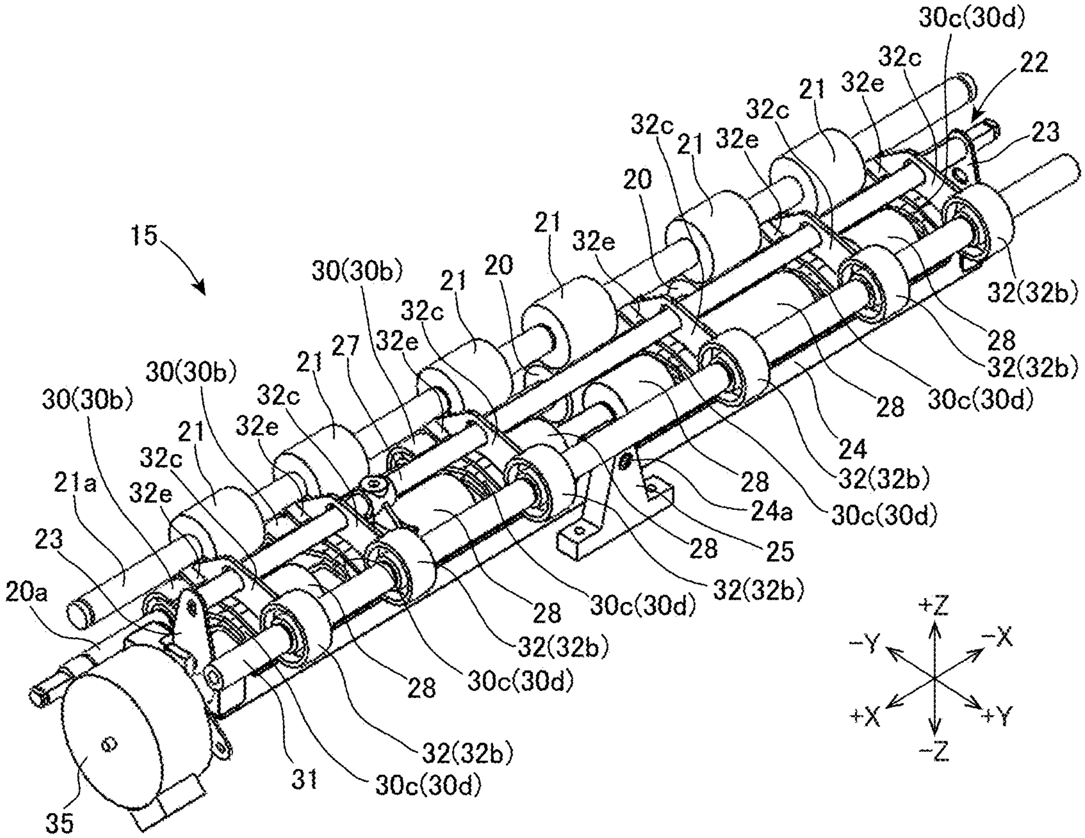
FIG. 4 is a perspective view of a skew correction unit included in the sheet conveyance device of the image forming device.
Figure 5:
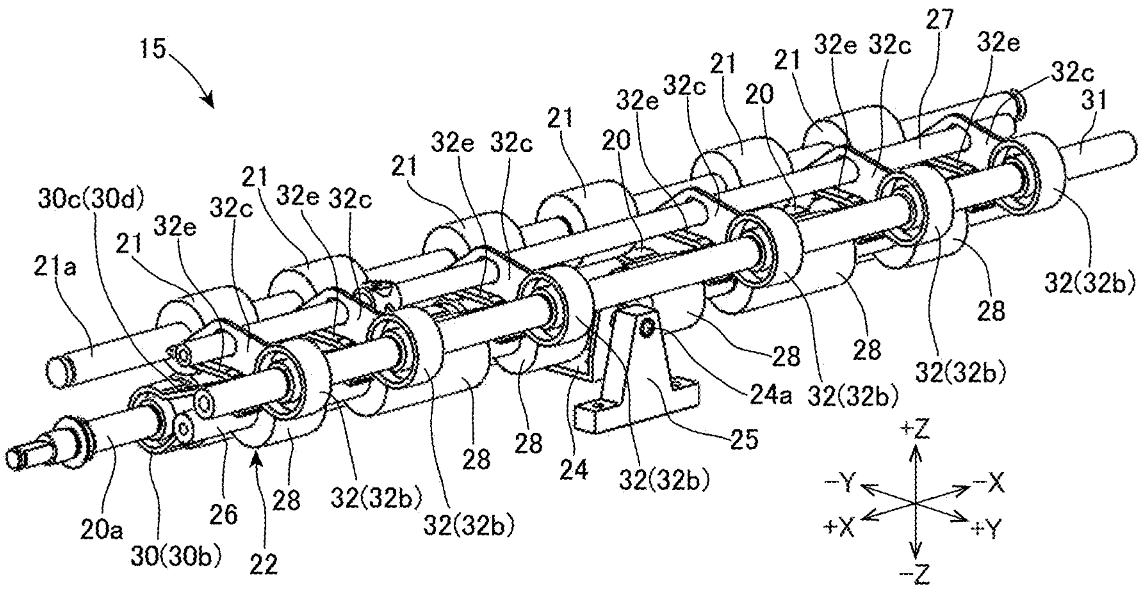
FIG. 5 is a perspective view of the skew correction unit.

As illustrated in FIGS. 4 and 5, a plurality of conveyance rollers 20 and a plurality of conveyance rollers 21 are arranged at predetermined intervals in the X-axis direction. The plurality of conveyance rollers 20 and the plurality of conveyance rollers 21 are arranged in the same region in the X-axis direction, and a pair of each conveyance roller 20 and each conveyance roller 21 sandwiches the sheet S.

A swing unit 22 is provided on the +Y direction side of the conveyance rollers 20 and the conveyance rollers 21. As illustrated in FIGS. 1 and 2, the swing unit 22 is disposed on the +Y direction side with respect to the skewed amount detection sensors 17, and the skew feeding of the sheet S detected by the skewed amount detection sensors 17 can be corrected by the operation of the swing unit 22.

Figure 6:
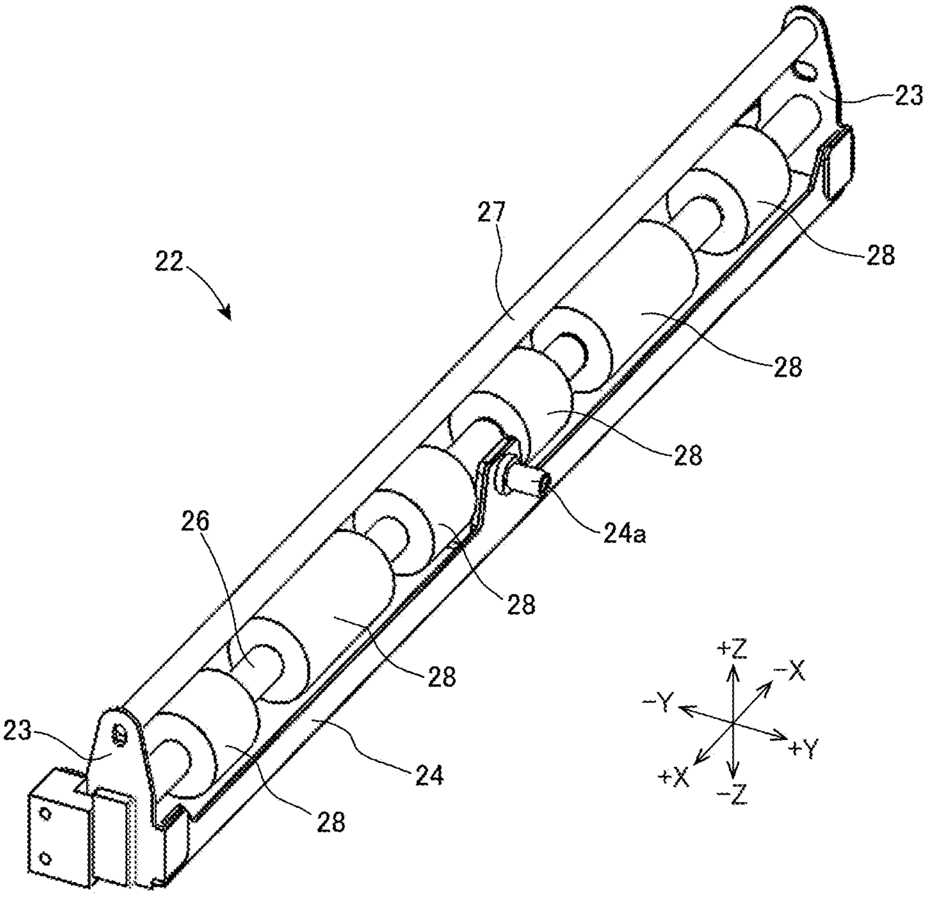
FIG. 6 is a perspective view of a swing unit forming the skew correction unit.
Figure 7:
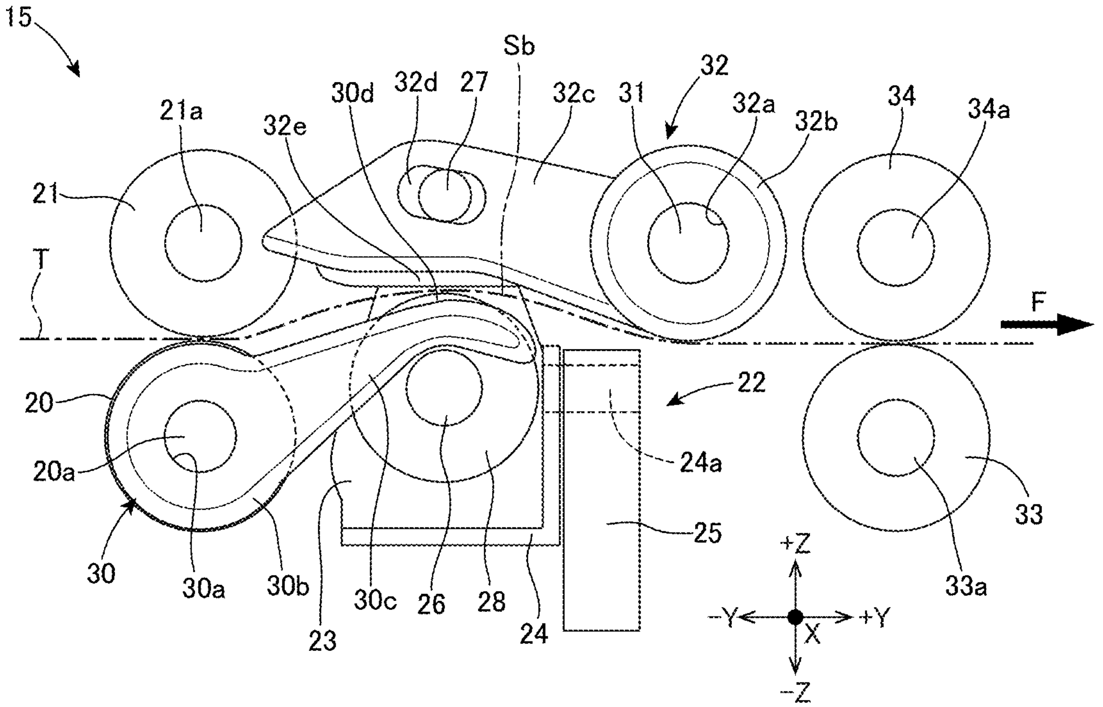
FIG. 7 is a side view of the skew correction unit in a reference state.

As illustrated in FIG. 6, the swing unit 22 includes a pair of side walls 23 disposed apart from each other in the X-axis direction, and a connecting portion 24 that connects the pair of side walls 23. The connecting portion 24 extends in the X-axis direction, and a rotation shaft 24*a* extending in the Y-axis direction is provided substantially at the center of the connecting portion 24 in the longitudinal direction. The rotation shaft 24*a* is inserted into a shaft hole formed in a rotation support unit 25 (see FIGS. 4 and 5) fixedly supported inside the image forming device 1. The swing unit 22 is rotatably supported around an axis (an axis extending in the Y-axis direction) parallel to the conveyance direction F via the shaft hole of the rotation support unit 25 and the rotation shaft 24*a*. The rotation shaft 24*a* is provided across a substantially central position in the length direction of a first support shaft 26 in plan view.

The swing unit 22 further includes the first support shaft 26 and a second support shaft 27 substantially parallel to each other. The first support shaft 26 is disposed on the −Z direction side of the conveyance path T, and the second support shaft 27 is disposed on the +Z direction side of the conveyance path T. Each of the first support shaft 26 and the second support shaft 27 is a shaft having a circular cross section extending in the X-axis direction, and both ends thereof are supported by a pair of side walls 23.

A plurality of guide rollers 28 having a cylindrical shape are rotatably supported by the first support shaft 26. The plurality of guide rollers 28 are arranged at predetermined intervals in the axial direction (the X-axis direction) of the first support shaft 26.

The shaft member 20*a* supports a plurality of lower guides 30 separately from the conveyance rollers 20. The plurality of lower guides 30 are arranged at positions different from each other in the X-axis direction, and are positioned between the plurality of conveyance rollers 20 (each positioned alternately with each of the plurality of conveyance rollers 20) in the X-axis direction. As illustrated in FIG. 7, each of the lower guides 30 includes a cylindrical portion 30*b* having a shaft hole 30*a* into which the shaft member 20*a* is inserted as a center, and a guide arm 30*c* protruding toward the +Y direction side with respect to the cylindrical portion 30*b*.

The shaft hole 30*a* is not fixed in the rotation direction with respect to the shaft member 20*a*, and each of the plurality of lower guides 30 is individually rotatably supported with respect to the shaft member 20*a* via the shaft hole 30*a*. The cylindrical portion 30*b* has a cylindrical shape having substantially the same diameter as the conveyance rollers 20. The guide arms 30*c* are disposed between the plurality of guide rollers 28 in the X-axis direction, and a lower surface near a distal end of each of the guide arms 30*c* is supported by the first support shaft 26 (see FIG. 7). In each of the lower guides 30, a guide surface 30*d* having a mountain-like arc-shape protruding toward the +Z direction side in a state where the guide arm 30*c* is supported by the first support shaft 26 is formed on the upper surface side of the guide arm 30*c*. The guide surface 30*d* has a shape along a part of the outer peripheral surface of the guide rollers 28.

A support shaft 31 extending in the X-axis direction is provided on the +Y direction side of the swing unit 22. The support shaft 31 supports a plurality of upper guides 32 at predetermined intervals in the axial direction (the X-axis direction). The plurality of upper guides 32 are arranged at substantially the same interval and length as the plurality of lower guides 30 in the X-axis direction. As illustrated in FIG. 7, each of the upper guides 32 includes a cylindrical portion 32*b* having a shaft hole 32*a* into which the support shaft 31 is inserted as a center, and a guide arm 32*c* protruding toward the −Y direction side with respect to the cylindrical portion 32*b*.

The shaft hole 32*a* is not fixed in the rotation direction with respect to the support shaft 31, and each of the plurality of upper guides 32 is individually rotatably supported with respect to the support shaft 31 via the shaft hole 32*a*. As illustrated in FIG. 7, the guide arm 32*c* is formed with a long hole 32*d* whose longitudinal direction is directed in the radial direction around the shaft hole 32*a*. The second support shaft 27 is inserted into the long hole 32*d*, and the guide arm 32*c* is supported via the second support shaft 27. In each of the upper guides 32, a guide surface 32*e* is formed on the lower surface side of the guide arm 32*c*. The guide surface 32*e* is an arc-shaped valley-like surface recessed toward the +Z direction side in a state where the guide arm 32*c* is supported by the second support shaft 27.

In the skew correction unit 15, at the position of the swing unit 22, the guide arms 30*c* of the plurality of lower guides 30 arranged at intervals in the X-axis direction that is the width direction of the sheet S form a plurality of first guide members that support the lower surface side of the sheet S by the guide surfaces 30*d*. The guide arms 32*c* of the plurality of upper guides 32 arranged at intervals in the X-axis direction form a plurality of second guide members that support the upper surface side of the sheet S by the guide surfaces 32*c*. In the plurality of guide arms 30*c* and the plurality of guide arms 32*c*, the guide surfaces 30*d* and the guide surfaces 32*e* face each other in the Z-axis direction with the conveyance path T interposed therebetween, and the sheet S passes between the guide surfaces 30*d* and the guide surfaces 32*c*. The plurality of guide rollers 28 disposed between the plurality of guide arms 30*c* in the X-axis direction form a plurality of auxiliary guide members that support the lower surface side of the sheet S together with the guide arms 30*c*.

As illustrated in FIG. 7, the conveyance path T of the sheet S traveling in the conveyance direction F by the skew correction unit 15 passes between the conveyance rollers 20 and the conveyance rollers 21 located on the −Y direction side, passes through the support position by the guide members (the guide arms 30*c*, the guide arms 32*c*, and the guide rollers 28) of the swing unit 22, and goes along the outer peripheral surface of the cylindrical portions 32*b* of the upper guides 32 on the +Y direction side. The support position of the sheet S in the guide members of the swing unit 22 is located on the +Z direction side with respect to the nipping position of the sheet S by the conveyance rollers 20 and the conveyance rollers 21 and the support position of the sheet S by the cylindrical portions 32*b* of the upper guides 32. Therefore, at the position of the swing unit 22, the sheet S is partially pushed up to have a shape protruding toward the +Z direction side, and a mountain-like slack portion Sb (sec FIGS. 2, 7, and 13) slackened in the direction orthogonal to the conveyance direction F is formed.

As illustrated in FIG. 7, on the +Y direction side of the swing unit 22, a pair of conveyance roller 33 and conveyance roller 34 arranged on the −Z direction side and the +Z direction side with the conveyance path T interposed therebetween is provided. The conveyance roller 33 and the conveyance roller 34 are respectively rotatably supported via a shaft member 33*a* and a shaft member 34*a* extending in the X-axis direction. The sheet S that has passed through the swing unit 22 goes along the cylindrical portions 32*b* of the upper guides 32, further passes between the conveyance roller 33 and the conveyance roller 34, and advances in the conveyance direction F.

As illustrated in FIG. 4, the skew correction unit 15 includes a motor unit 35 that applies a force for rotating about the rotation shaft 24*a* to the swing unit 22. The motor unit 35 is provided at a position adjacent to a side wall 23 on the +X direction side of the swing unit 22, and when the motor included in the motor unit 35 is driven, the driving force is transmitted via a transmission mechanism (not illustrated), and the position of the side wall 23 changes in the Z-axis direction. As a result, the swing unit 22 rotates (swings) about the axis of the rotation shaft 24*a*. The rotation direction of the swing unit 22 is changed by switching the driving direction of the motor of the motor unit 35, and the rotation angle of the swing unit 22 is changed according to the driving amount of the motor of the motor unit 35.

Figure 8:
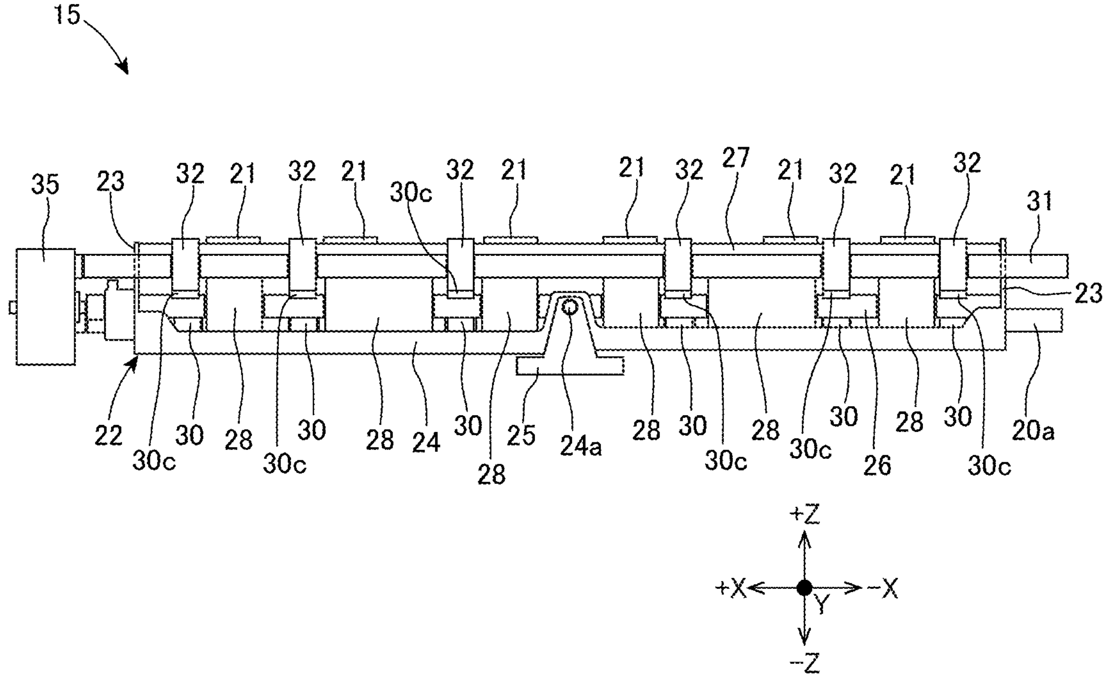
FIG. 8 is a front view of the skew correction unit in a reference state.
Figure 9:
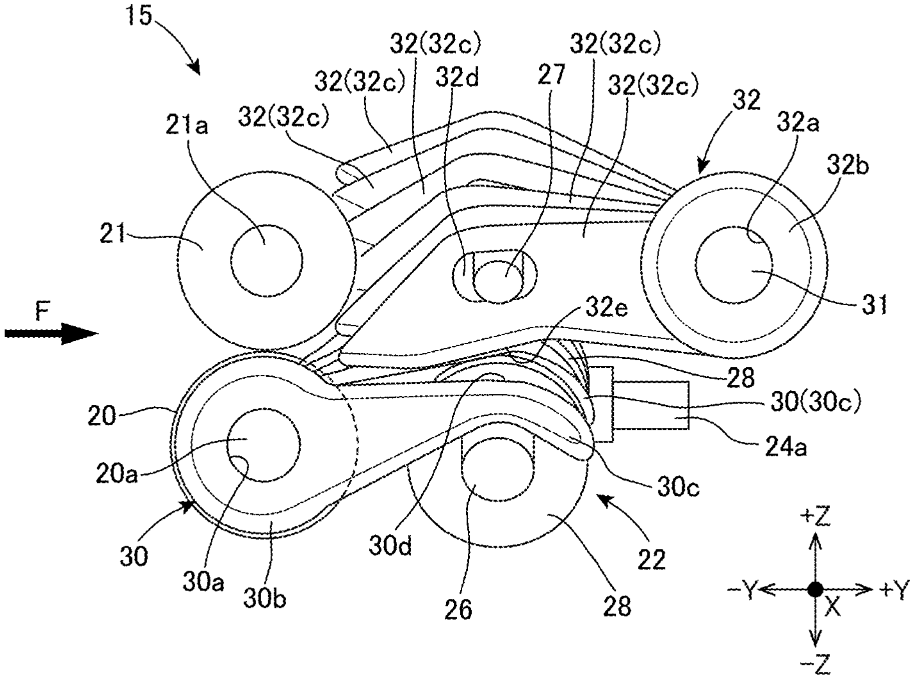
FIG. 9 is a side view illustrating a state in which the swing unit of the skew correction unit is rotated in the first direction.
Figure 10:
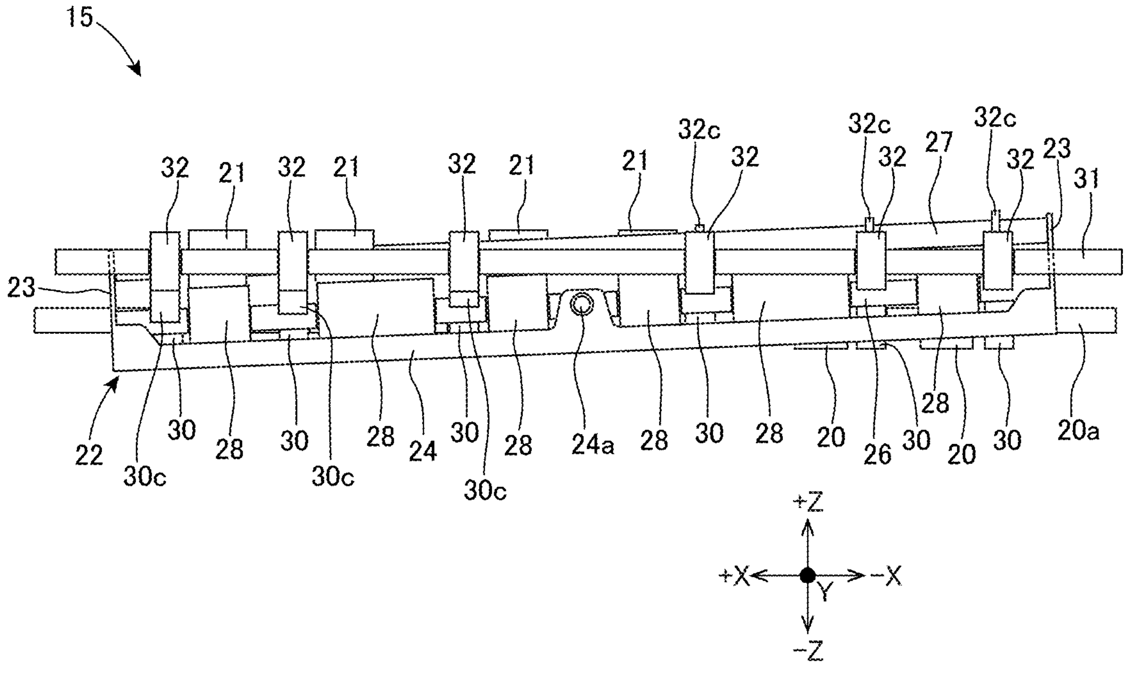
FIG. 10 is a front view illustrating a state in which the swing unit of the skew correction unit is rotated in the first direction.
Figure 11:
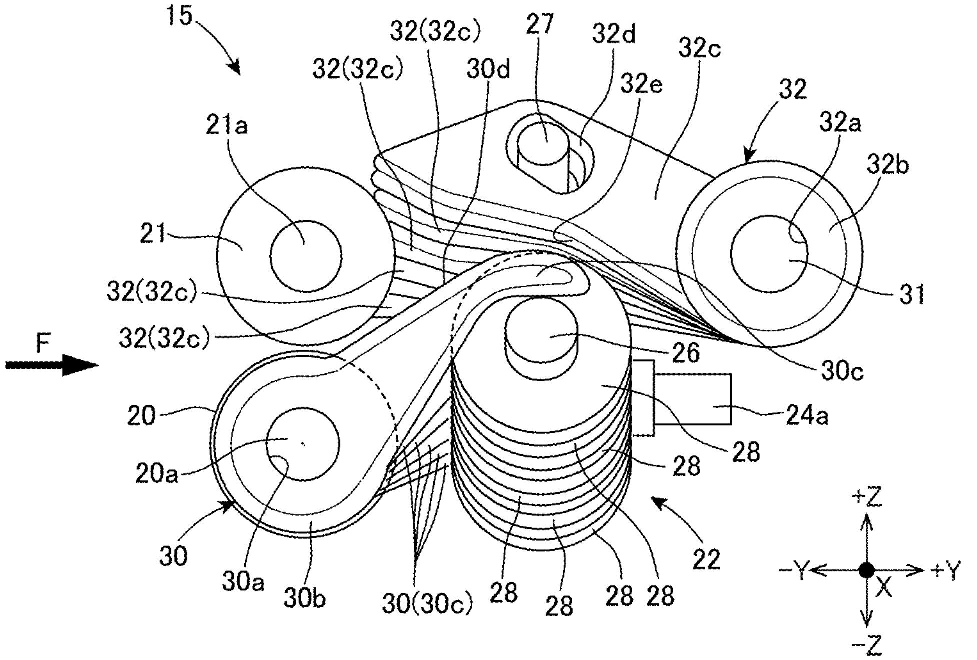
FIG. 11 is a side view illustrating a state in which the swing unit of the skew correction unit is rotated in the second direction.
Figure 12:
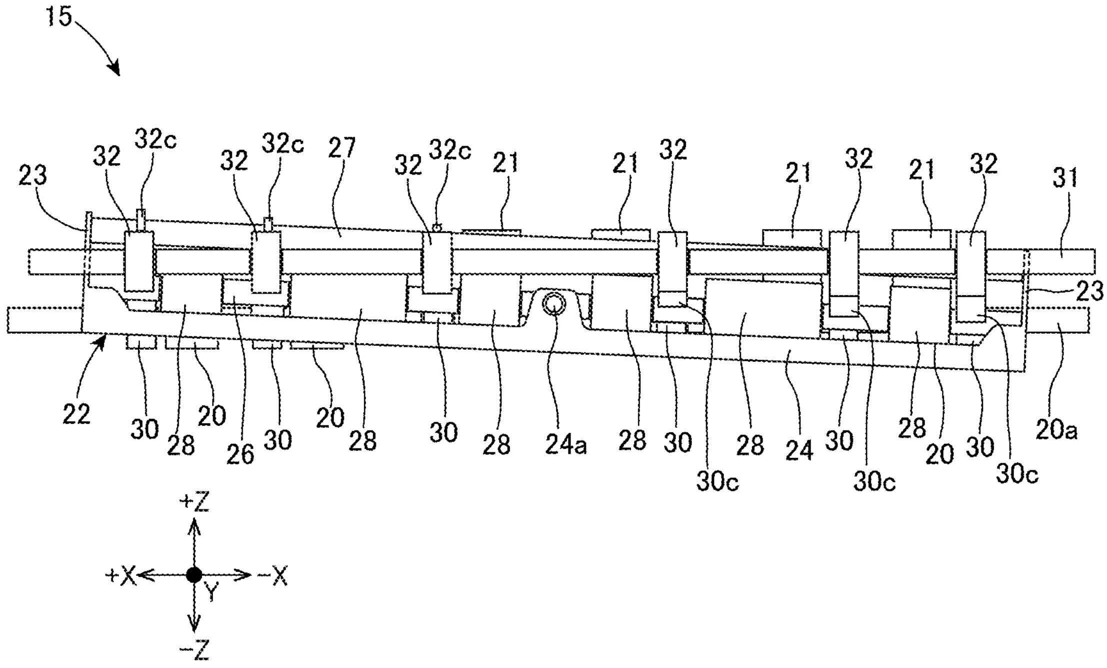
FIG. 12 is a front view illustrating a state in which the swing unit of the skew correction unit is rotated in the second direction.

In a case where the swing unit 22 rotates about the rotation shaft 24*a*, angles of the first support shaft 26 and the second support shaft 27 with respect to the X-axis direction change along a plane orthogonal to the conveyance direction F. FIGS. 7 and 8 illustrate the skew correction unit 15 in a reference state in which the first support shaft 26 and the second support shaft 27 are parallel to the X-axis direction. FIGS. 9 and 10 illustrate the skew correction unit 15 in a state in which the swing unit 22 is rotated in a first direction in which the side wall 23 on the +X direction side is displaced to the −Z direction side and the side wall 23 on the −X direction side is displaced to the +Z direction side. FIGS. 11 and 12 illustrate the skew correction unit 15 in a state in which the swing unit 22 is rotated in a second direction in which the side wall 23 on the +X direction side is displaced to the +Z direction side and the side wall 23 on the −X direction side is displaced to the −Z direction side.

As illustrated in FIGS. 9 to 12, in a case where the angle of the first support shaft 26 with respect to the X-axis direction changes, each of the plurality of lower guides 30 changes the height position in the Z-axis direction of the guide surface 30*d* of the guide arm 30*c* supported by the first support shaft 26 following the first support shaft 26. In a case where the angle of the first support shaft 26 with respect to the X-axis direction changes, the inclination (the height position in the Z-axis direction) of the outer peripheral surfaces of the plurality of guide rollers 28 supported by the first support shaft 26 changes.

In the plurality of lower guides 30, the height positions of the guide arms 30*c* are changed stepwise according to the inclination of the first support shaft 26, and the displacement amount in the Z-axis direction becomes larger as the guide surface 30*d* of the guide arm 30*c* disposed away from the rotation shaft 24*a* in the X-axis direction becomes larger. In the plurality of guide rollers 28, the height positions of the outer peripheral surfaces are changed stepwise according to the inclination of the first support shaft 26, and the displacement amount in the Z-axis direction becomes larger as the outer peripheral surface of the guide roller 28 is disposed away from the rotation shaft 24*a* in the X-axis direction. Therefore, when the swing unit 22 rotates, the inclination of the lower guide surface configured by the plurality of guide surfaces 30*d* and the plurality of guide rollers 28 changes.

As illustrated in FIGS. 9 to 12, when the angle of the second support shaft 27 changes, the force is transmitted to the plurality of upper guides 32 through the long holes 32*d* through which the second support shaft 27 is inserted, and the plurality of upper guides 32 change the height positions of the guide surfaces 32*e* of the guide arms 32*c* in the Z-axis direction following the second support shaft 27. At this time, by changing the position of the second support shaft 27 in the guide arms 32*c* in the longitudinal direction of the long holes 32*d*, the difference in the inclination angle of each guide arm 32*c* is absorbed, and the plurality of upper guides 32 are operated smoothly.

In the plurality of upper guides 32, the height positions of the guide arms 32*c* are changed stepwise according to the inclination of the second support shaft 27, and the displacement amount in the Z-axis direction becomes larger as the guide surface 32*e* of the guide arm 32*c* disposed away from the rotation shaft 24*a* in the X-axis direction becomes larger. Therefore, when the swing unit 22 rotates, the inclination of the upper guide surface configured by the plurality of guide surfaces 32*e* changes.

As described above, the skew correction unit 15 changes the inclination of the guide members (the upper and lower guide surfaces) supporting the surfaces on both sides of the sheet S with respect to the X-axis direction by the rotation of the swing unit 22. Since the first support shaft 26 and the second support shaft 27 in the swing unit 22 extend on both sides in the X-axis direction from the axis of the rotation shaft 24*a* as the rotation center, the displacement direction of the guide members in the Z-axis direction are reversed between the region on the +X-direction side and the region on the −X-direction side with the rotation shaft 24*a* interposed therebetween. Further, as the distance in the X-axis direction from the rotation shaft 24*a* increases, the displacement amount of the guide members in the Z-axis direction increase when the swing unit 22 rotates. Then, the sheet S is displaced according to the displacement of the guide members.

Specifically, in the region where the guide members of the swing unit 22 are displaced to the +Z direction side, the guide arms 30*c* and the guide rollers 28, which are guide members arranged on the −Z direction side of the conveyance path T, push up the sheet S to the +Z direction side, thereby displacing the sheet S to the +Z direction side. In a region where the guide members of the swing unit 22 are displaced to the −Z direction side, the guide arms 32*c*, which are the guide members arranged on the +Z direction side of the conveyance path T, pushes down the sheet S to the −Z direction side to displace the sheet S.

In the reference state of the swing unit 22 illustrated in FIGS. 7 and 8, the first support shaft 26 and the second support shaft 27 are not inclined with respect to the X-axis direction, and the height positions of the guide members at the position of the swing unit 22 are uniform throughout the X-axis direction. Therefore, the sheet S forms the slack portion Sb having the same shape over the entire region in the width direction, and the entire sheet S moves along the conveyance path having the same length in the width direction. In this state, the skew correction unit 15 conveys the entire area in the width direction of the sheet S in the conveyance direction F with a uniform conveyance amount without performing the skew feeding correction of the sheet S.

Figure 13:
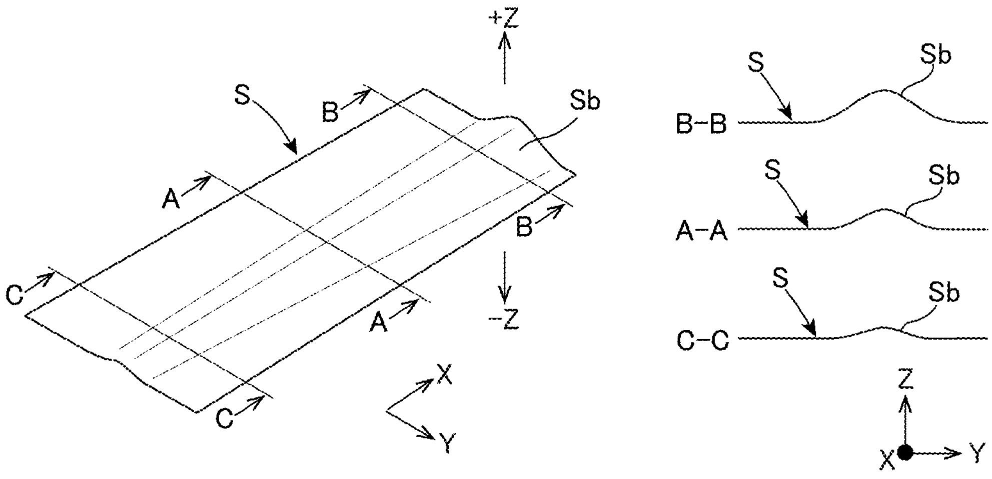
FIG. 13 is a diagram for explaining skew feeding correction of a sheet by the skew correction unit.

FIG. 13 illustrates a change in the conveyance path of the sheet S in a case where the swing unit 22 is displaced so as to rotate the region in the width direction (the X-axis direction) of the sheet S about the axis parallel to the conveyance direction F. A line A-A in FIG. 13 is a position corresponding to the rotation center of the swing unit 22 (the axis of the rotation shaft 24*a*) in the width direction of the sheet S. A line B-B in FIG. 13 indicates a position where the guide members of the swing unit 22 is displaced in the +Z direction from the reference state in the width direction of the sheet S, and particularly indicates a position close to one side edge of the sheet S having the largest displacement amount in the +Z direction. A line C-C in FIG. 13 indicates a position where the guide members of the swing unit 22 is displaced in the −Z direction from the reference state in the width direction of the sheet S, and particularly indicates a position close to the other side edge of the sheet S having the largest displacement amount in the −Z direction.

As can be seen from FIG. 13, in the region where the guide members of the swing unit 22 are displaced to the +Z direction side (the position of line B-B), the slack amount of the slack portion Sb increases, and the conveyance path of the sheet S is longer than that in the reference state. On the other hand, in the region where the guide members of the swing unit 22 are displaced to the −Z direction side (the position of line C-C), the slack amount of the slack portion Sb decreases, and the conveyance path of the sheet S is shorter than that in the reference state. The skew correction unit 15 performs the skew feeding correction of the sheet S using such a change in the conveyance path length on both sides in the width direction of the sheet S.

For example, as illustrated in FIGS. 9 and 10, in a case where the swing unit 22 is rotated in the first direction, the region in the width direction of the sheet S supported by the guide members of the swing unit 22 is rotated in the first direction around the axis parallel to the conveyance direction F, the height of the region on the −X direction side is displaced to the +Z direction side, and the height of the region on the +X direction side is displaced to the −Z direction side. Then, in the region on the −X direction side of the sheet S, the slack portion Sb having a shape in which the amount of protrusion toward the +Z direction side is increased from that in the reference state is formed (see the position of the line B-B in FIG. 13), and the conveyance path of the sheet S becomes longer than that in the reference state. In the region on the +X direction side of the sheet S, the slack portion Sb having a shape in which the amount of protrusion toward the +Z direction side is reduced from that in the reference state is formed (sec the position of line C-C in FIG. 13), and the conveyance path of the sheet S becomes shorter than that in the reference state. As a result, in the sheet S, the region on the −X direction side where the conveyance path is longer reaches the image forming unit 10 later than the region on the +X direction side where the conveyance path is shorter.

As illustrated in FIGS. 11 and 12, in a case where the swing unit 22 is rotated in the second direction, the region in the width direction of the sheet S supported by the guide members of the swing unit 22 is rotated in the second direction around the axis parallel to the conveyance direction F, the height of the region on the +X direction side is displaced to the +Z direction side, and the height of the region on the −X direction side is displaced to the −Z direction side. Then, in the region on the +X direction side of the sheet S, the slack portion Sb having a shape in which the amount of protrusion toward the +Z direction side is increased from that in the reference state is formed (sec the position of the line B-B in FIG. 13), and the conveyance path of the sheet S becomes longer than that in the reference state. In the region on the −X direction side of the sheet S, the slack portion Sb having a shape in which the protruding amount toward the +Z direction side is reduced from that in the reference state is formed (see the position of the line C-C in FIG. 13), and the conveyance path of the sheet S becomes shorter than that in the reference state. As a result, in the sheet S, the region on the +X direction side where the conveyance path is longer reaches the image forming unit 10 later than the region on the —X direction side where the conveyance path is shorter.

As described above, the timing at which the region on the +X direction side and the region on the −X direction side of the sheet S reach the image forming unit 10 can be changed according to the direction in which the swing unit 22 is inclined with respect to the X-axis direction. Therefore, in a case where the sheet S is skewed, by causing the swing unit 22 to perform the operation of displacing the guide members toward the +Z direction side with respect to the region in the X-axis direction on the side where the position of the sheet end Sa precedes in the conveyance direction F, the degree of skew feeding of the sheet S can be reduced, and the direction of the sheet end Sa after passing through the swing unit 22 can be close to parallel to the X-axis direction.

As the inclination of the swing unit 22 with respect to the X-axis direction increases, the difference in the length of the conveyance path between the region on the +X direction side and the region on the −X direction side of the swing unit 22 increases. Therefore, by appropriately adjusting the inclination angle of the swing unit 22 according to the skew amount of the sheet S, the skew feeding of the sheet S can be corrected by making the direction of the sheet end Sa completely parallel to the X-axis direction.

In a case where the sheet conveyance device 11 conveys the sheet S, the control unit 40 detects the presence or absence of skew feeding of the sheet S using the skewed amount detection sensors 17 at two locations. In a case where the sheet S is not skewed, the control unit 40 maintains the swing unit 22 in the reference state (FIGS. 7 and 8).

In a case where the sheet S is skewed, the control unit 40 calculates the skewed amount of the sheet S, and determines the rotation direction and the rotation amount of the swing unit 22 for correcting the skew feeding based on the skewed amount. The storage unit of the control unit 40 stores calculation data and table data for determining the rotation direction and the rotation amount of the swing unit 22 based on the skewed amount detected by the skewed amount detection sensors 17. The control unit 40 transmits a drive signal corresponding to the determined rotation direction and rotation amount of the swing unit 22 to the motor unit 35, and the motor unit 35 that has received the drive signal operates to rotate the swing unit 22.

By performing the above control for each sheet S, the sheet conveyance device 11 can correct skew feeding of the sheet S and convey the sheet S to the image forming unit 10.

As a result of rotating the swing unit 22, in a case where the conveyance path of the sheet S is in a flat state without unevenness in the Z-axis direction (a state in which the mountain shape of the slack portion Sb existing in the reference state is eliminated) at either the end on the +X direction side or the end on the −X direction side, the difference in length between the conveyance paths at both ends in the X-axis direction becomes maximum. This state corresponds to the maximum skewed amount that can be corrected by the skew correction unit 15. The correctable skewed amount increases as the length of the slack portion Sb in the reference state of the skew correction unit 15 increases. However, if the length of the slack portion Sb is excessively increased by the skew correction unit 15, bending, catching, or an excessive load may occur at the time of conveying the sheet S. Therefore, the slack portion Sb in the reference state is set within a range in which smooth conveyance of the sheet S can be realized.

As described above, in the sheet conveyance device 11 of the present embodiment, the skew correction unit 15 serving as the skew corrector includes the guide members (the guide arms 30*c*, the guide arms 32*c*, and the guide rollers 28) that support the sheet S along the width direction, and the guide members are displaced so as to rotate the region in the width direction of the sheet S supported by the guide members about the axis parallel to the conveyance direction F according to the skewed amount of the sheet S detected by the skewed amount detection sensors 17.

As a result, the skew correction unit 15 can correct the skew feeding while continuously conveying the sheet S without temporarily stopping the conveyance of the sheet S. Therefore, as compared with a configuration in which skew feeding is corrected by stopping the register roller, the conveyance speed per unit time can be improved, and efficient sheet conveyance can be realized.

Since the skew correction unit 15 displaces the guide members along the plane orthogonal to the conveyance direction F, a long space is not required along the conveyance direction F, and the size in the Y-axis direction can be reduced.

In addition, since the skew correction unit 15 corrects the skew feeding by rotating the region in the width direction of the sheet S supported by the guide members about the axis parallel to the conveyance direction F, the distortion of the sheet S hardly occurs and the sheet S can be conveyed with high accuracy as compared with the skew feeding correction structure in which the operation speeds of the plurality of conveying units arranged at different positions in the conveyance direction F are relatively changed.

The skew correction unit 15 slackens the sheet S in the direction orthogonal to the conveyance direction F and supports the sheet S by the guide members (forms the slack portion Sb), and changes the conveyance path length by relatively changing the slack amount on both sides in the width direction of the sheet S by the displacement of the guide members. As a result, even in the case of skew feeding in which one or the other region of both sides in the width direction of the sheet S precedes in the conveyance direction F, the skew feeding can be corrected by switching the direction of rotation by the guide members. In addition, the conveyance path of the sheet S in the skew correction unit 15 is formed by the slack portion Sb that is gently curved, and the sheet S can be smoothly passed through the skew correction unit 15 without applying a large load to the sheet S.

The skew correction unit 15 includes a first support shaft 26 and a second support shaft 27 that are respectively disposed on one side and the other side with respect to the conveyance path T of the sheet S in a direction (the Z-axis direction) orthogonal to the conveyance direction F of the sheet S and extend in the width direction (the X-axis direction) of the sheet S. The first support shaft 26 and the second support shaft 27 are integrally rotated around an axis parallel to the conveyance direction F according to the skewed amount of the sheet S. Both side surfaces of the sheet S are supported by the guide arms 30*c* that are the first guide members operating following the first support shaft 26 and the guide arms 32*c* that are the second guide members operating following the second support shaft 27.

Accordingly, the guide arms 30*c* and the guide arms 32*c* are aggregated in the vicinity of the first support shaft 26 and the second support shaft 27 arranged at a predetermined interval in the Z-axis direction to form a space-saving structure, so that both side surfaces of the sheet S can be supported by the guide members. In addition, since the first support shaft 26 and the second support shaft 27 are integrally rotated as the swing unit 22, the guide arms 30*c* and the guide arms 32*c* arranged in a distributed manner on both sides of the conveyance path T in the Z-axis direction can be driven in conjunction with each other with a simple structure. Therefore, the operations of the first support shaft 26 and the second support shaft 27 are transmitted to the sheet S via the guide arms 30*c* and the guide arms 32*c* without delay, and the skew correction having excellent responsiveness of the operation can be realized.

The lower guides 30 including the guide arms 30*c* are supported via the shaft member 20*a* that supports the conveyance rollers 20 arranged adjacent to the −Y direction side of the swing unit 22. As described above, since the lower guides 30 are supported in a form of straddling the shaft member 20*a* supporting the conveyance rollers 20 and the first support shaft 26 supporting the guide arms 30*c* and the guide rollers 28, the lower guides 30 can be provided with a structure having excellent space efficiency.

The upper guides 32 including the guide arms 32*c* are supported via the support shaft 31 arranged adjacent to the +Y direction side of the swing unit 22. As illustrated in FIG. 7, the cylindrical portions 32*b* of the upper guides 32 supported by the support shaft 31 have a function of guiding the conveyance of the sheet S after passing through the swing unit 22. That is, in the upper guides 32, not only the guide arms 32*c* but also the cylindrical portions 32*b* contribute to the formation of the conveyance path T of the sheet S including the slack portion Sb. As described above, since the upper guides 32 have a combined function of the cylindrical portions 32*b* and the guide arms 32*c*, the skew correction unit 15 can be efficiently configured with a small number of components.

The skew correction unit 15 includes a plurality of guide rollers 28 in addition to the plurality of guide arms 30*c* as the guide members that support the lower side (the −Z direction side) of the sheet S. The plurality of guide arms 30*c* are arranged at intervals in the width direction of the sheet S, and the plurality of guide rollers 28 are arranged between the plurality of guide arms 30*c*. By providing the plurality of guide rollers 28 so as to fill the gap between the plurality of guide arms 30*c* in the width direction of the sheet S, the lower surface side of the sheet S is supported in a wide range in the width direction to improve the stability of the sheet S, and the sheet S can be reliably displaced in the +Z-axis direction at the time of skew correction. Since the guide rollers 28 are supported by the first support shaft 26 together with the guide arms 30*c*, it is possible to displace the guide rollers 28 together with the guide arms 30*c* with a simple structure without requiring a dedicated drive source or the like for operating the guide rollers 28.

Note that a guide roller(s) similar to the guide rollers 28 may be provided as a guide member that supports the upper side (the +Z direction side) of the sheet S. Specifically, a plurality of guide rollers rotatably supported via the second support shaft 27 can be provided between the plurality of guide arms 32*c* arranged at intervals in the width direction of the sheet S. Therefore, in order to complement either the guide arms 30*c* or the guide arms 32*c*, it is preferable that at least one of the first support shaft 26 and the second support shaft 27 supports a guide roller(s) (including the guide rollers 28) positioned between the plurality of guide arms 30*c* and the plurality of guide arms 32*c* in the width direction of the sheet S.

The guide members for skew correction are not limited to the configurations of the guide arms 30*c*, the guide arms 32*c*, and the guide rollers 28 of the above embodiment. FIGS. 14 to 17 illustrate a skew correction unit 50 of a different embodiment. Note that, in FIGS. 14 to 17, components other than the skew correction unit 50 are not illustrated in the sheet conveyance device, but components other than the skew correction unit 50 are similar to those of the sheet conveyance device 11 of the above embodiment.

Figure 14:
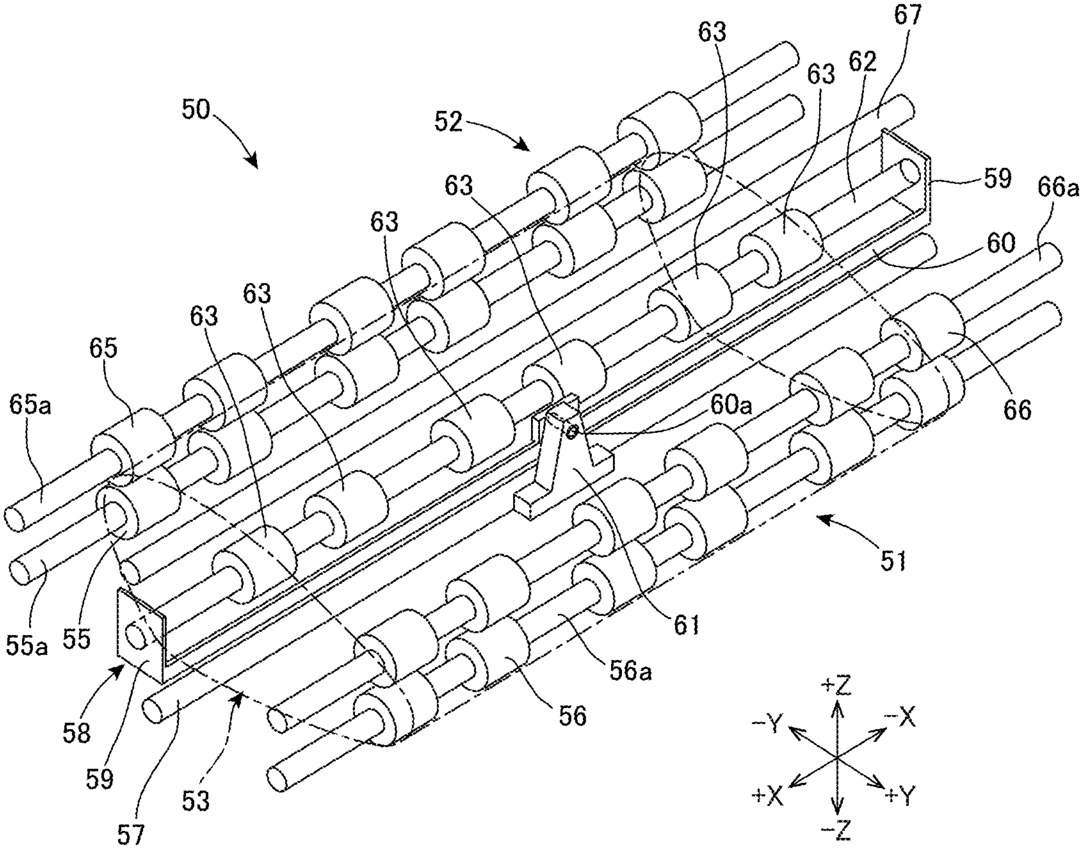
FIG. 14 is a perspective view illustrating a skew correction unit according to a different embodiment.

The skew correction unit 50 includes a lower guide unit 51 arranged on the −Z direction side and an upper guide unit 52 arranged on the +Z direction side. A first belt member 53 having an endless form (a loop shape) included in the lower guide unit 51 and a second belt member 54 having an endless form included in the upper guide unit 52 form a guide member of the skew correction unit 50. In FIG. 14, the second belt member 54 is not illustrated.

The lower guide unit 51 includes a plurality of upstream rollers 55 arranged on the −Y direction side and a plurality of downstream rollers 56 arranged on the +Y direction side. The plurality of upstream rollers 55 and the plurality of downstream rollers 56 are arranged at predetermined intervals in the X-axis direction. The upstream rollers 55 and the downstream rollers 56 are respectively rotatably supported via a shaft member 55*a* and a shaft member 56*a* extending in the X-axis direction, respectively. At least one set of the upstream rollers 55 and the downstream rollers 56 are rotationally driven by a conveyance motor (not illustrated). A first belt member 53 having an endless form is stretched around the upstream rollers 55 and the downstream rollers 56. A tensioner 57 having a bar shape extending in the X-axis direction is disposed between the upstream rollers 55 and the downstream rollers 56. The tensioner 57 applies a predetermined tension to the first belt member 53 by pushing the first belt member 53 toward the −Z direction side.

The lower guide unit 51 further includes a swing unit 58. The swing unit 58 is disposed between the upstream rollers 55 and the downstream rollers 56 in the Y-axis direction, and the tensioner 57 is disposed on the −Z direction side of the swing unit 58.

As illustrated in FIG. 14, the swing unit 58 includes a pair of side walls 59 disposed apart from each other in the X-axis direction, and a connecting portion 60 that connects the pair of side walls 59. The connecting portion 60 extends in the X-axis direction, and a rotation shaft 60*a* extending in the Y-axis direction is provided substantially at the center of the connecting portion 60 in the longitudinal direction. The rotation shaft 60*a* is inserted into a shaft hole formed in a rotation support unit 61 which is fixedly supported. Both ends of the shaft member 62 extending in parallel with the connecting portion 60 are supported by the pair of side walls 59.

The shaft member 62 rotatably supports a plurality of guide rollers 63. The plurality of guide rollers 63 are arranged at predetermined intervals in the longitudinal direction (the X-axis direction) of the shaft member 62. The outer peripheral surfaces of the plurality of guide rollers 63 are in contact with the lower surface of the first belt member 53 along a linear region extending in the X-axis direction at a position between the upstream rollers 55 and the downstream rollers 56 in the Y-axis direction.

The swing unit 58 including the plurality of guide rollers 63 is rotatably supported around an axis (the axis in the Y-axis direction) parallel to the conveyance direction F via the shaft hole of the rotation support unit 61 and the rotation shaft 60*a*. The swing unit 58 is given a force for turning about the rotation shaft 60*a* by a motor unit (not illustrated).

When the swing unit 58 rotates about the rotation shaft 60*a*, the angle of the shaft member 62 with respect to the X-axis direction changes along a plane orthogonal to the conveyance direction F. As the angle of the shaft member 62 changes, the inclination (the height position in the Z-axis direction) of the outer peripheral surfaces of the plurality of guide rollers 63 supported by the shaft member 62 changes. As a result, the region of the first belt member 53 supported on the outer peripheral surfaces of the plurality of guide rollers 63 is displaced along the plane orthogonal to the conveyance direction F, and the inclination with respect to the X-axis direction is changed.

The upper guide unit 52 includes a plurality of upstream rollers 65 arranged on the −Y direction side and a plurality of downstream rollers 66 arranged on the +Y direction side. The plurality of upstream rollers 65 and the plurality of downstream rollers 66 are arranged at predetermined intervals in the X-axis direction. The upstream rollers 65 and the downstream rollers 66 are respectively rotatably supported via a shaft member 65*a* and a shaft member 66*a* extending in the X-axis direction, respectively. At least one set of the upstream rollers 65 and the downstream rollers 66 are rotationally driven by a conveyance motor (not illustrated). A second belt member 54 having an endless form is stretched around the upstream rollers 65 and the downstream rollers 66. A tensioner 67 having a bar shape extending in the X-axis direction is disposed between the upstream rollers 65 and the downstream rollers 66. The tensioner 67 applies a predetermined tension to the second belt member 54 by pushing the second belt member 54 toward the +Z direction side.

Figure 15:
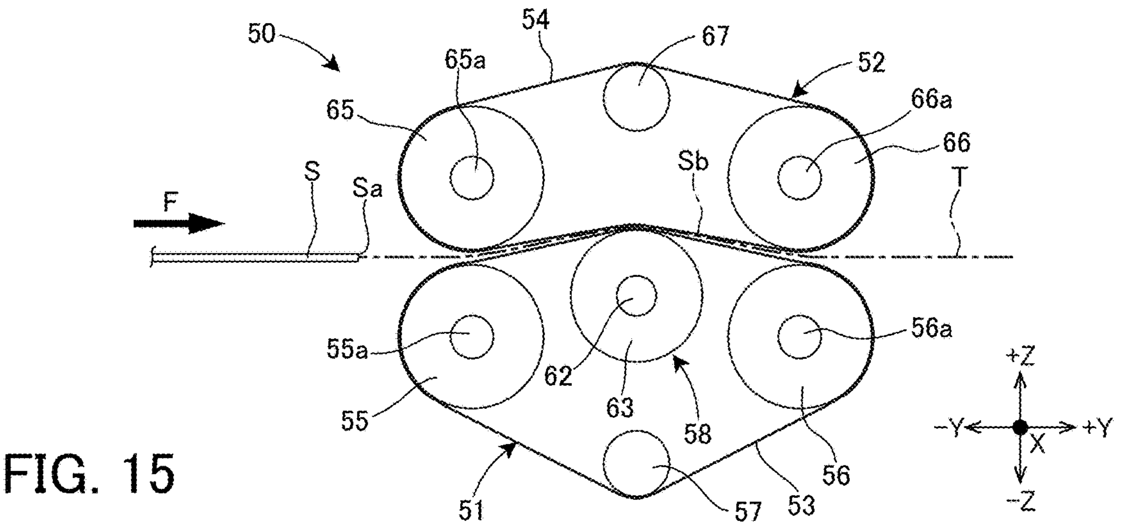
FIG. 15 is a side view illustrating a reference state of the skew correction unit according to the different embodiment.
Figure 16:
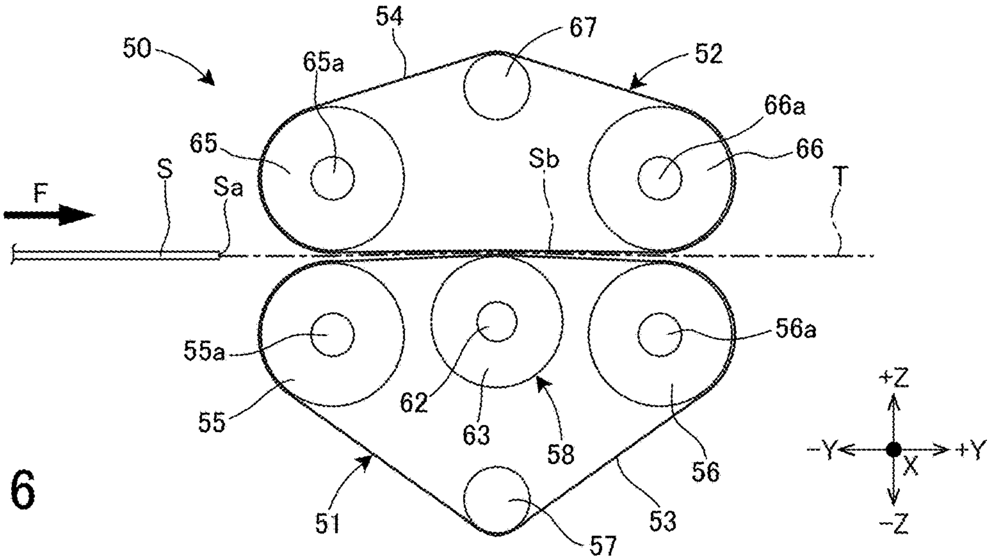
FIG. 16 is a side view illustrating a state in which the swing unit is rotated in the first direction at the skew correction unit of the different embodiment.
Figure 17:
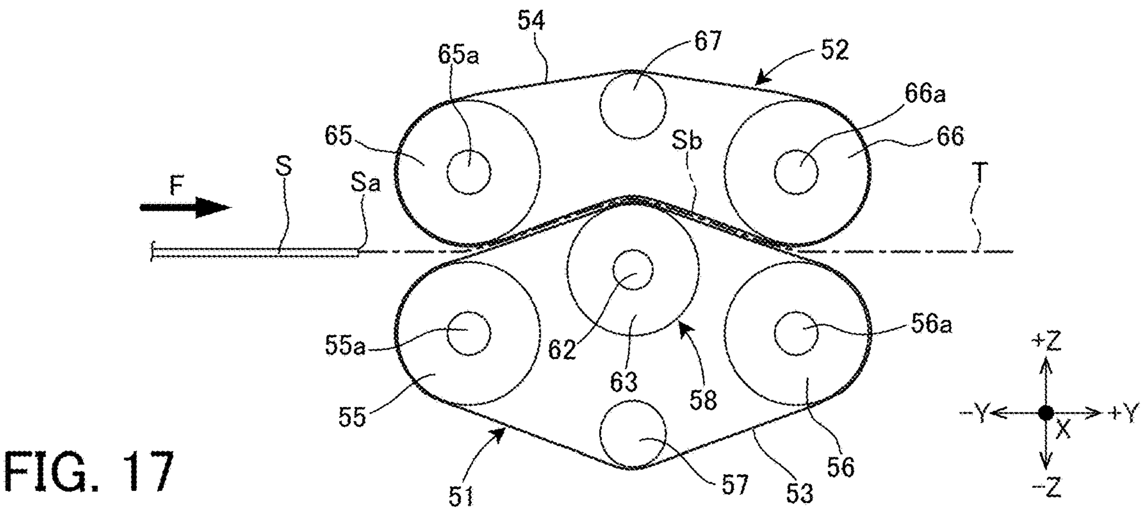
FIG. 17 is a side view illustrating a state in which the swing unit is rotated in the second direction at the skew correction unit of the different embodiment.

As illustrated in FIGS. 15 to 17, the conveyance path T of the sheet S in the skew correction unit 50 is formed in a portion where the first belt member 53 of the lower guide unit 51 and the second belt member 54 of the upper guide unit 52 face each other, and the first belt member 53 and the second belt member 54 have a support surface that supports the sheet S in the portion where the first belt member 53 and the second belt member 54 face. Then, the slack portion Sb is formed on the sheet S with the first belt member 53 as a lower guide member and the second belt member 54 as an upper guide member.

In a case where the swing unit 58 rotates about the rotation shaft 60*a*, the first belt member 53 and the second belt member 54 change the respective support surface shapes for supporting the sheet S, and are displaced so as to rotate the region in the width direction of the supported sheet S about the axis parallel to the conveyance direction F. FIGS. 15 to 17 illustrate examples of displacement of the sheet S at the end portion on the +X direction side of the skew correction unit 50.

In the reference state of the swing unit 58 illustrated in FIG. 15, the shaft member 62 is not inclined with respect to the X-axis direction, the entire region in the width direction of the sheet S forms the slack portion Sb having the same shape, and the entire region in the width direction of the sheet S moves along the conveyance path having the same length. In this state, the skew correction unit 50 conveys the entire area in the width direction of the sheet S in the conveyance direction F with a uniform conveyance amount without performing the skew feeding correction of the sheet S.

FIG. 16 illustrates the skew correction unit 50 in a state in which the swing unit 58 is rotated in the first direction in which the end on the +X direction side of the shaft member 62 is displaced to the −Z direction side and the end on the −X direction side of the shaft member 62 is displaced to the +Z direction side. In a case where the swing unit 58 is rotated in the first direction, the first belt member 53 supported by the plurality of guide rollers 63 displaces the height of the region on the −X direction side to the +Z direction side about the rotation shaft 60*a* and displaces the height of the region on the +X direction side to the −Z direction side in the plane orthogonal to the conveyance direction F. The second belt member 54 of the upper guide unit 52 is displaced following the displacement of the first belt member 53. Then, in the region on the +X direction side of the sheet S, the slack portion Sb having a shape in which the amount of protrusion toward the +Z direction side is reduced from that in the reference state is formed, and the conveyance path of the sheet S becomes shorter than that in the reference state. Although not illustrated in FIG. 16, in the region on the −X direction side of the sheet S, the slack portion Sb having a shape in which the amount of protrusion toward the +Z direction side is increased from that in the reference state is formed, and the conveyance path of the sheet S becomes longer than that in the reference state.

FIG. 17 illustrates the skew correction unit 50 in a state in which the swing unit 58 is rotated in the second direction in which the end on the +X direction side of the shaft member 62 is displaced to the +Z direction side and the end on the −X direction side of the shaft member 62 is displaced to the −Z direction side. In a case where the swing unit 58 is rotated in the second direction, the first belt member 53 supported by the plurality of guide rollers 63 displaces the height of the region on the +X direction side to the +Z direction side about the rotation shaft 60*a* and displaces the height of the region on the −X direction side to the −Z direction side in the plane orthogonal to the conveyance direction F. The second belt member 54 of the upper guide unit 52 is displaced following the displacement of the first belt member 53. Then, in the region on the +X direction side of the sheet S, the slack portion Sb having a shape in which the amount of protrusion toward the +Z direction side is increased from that in the reference state is formed, and the conveyance path of the sheet S becomes longer than that in the reference state. Although not illustrated in FIG. 17, in the region on the −X direction side of the sheet S, the slack portion Sb having a shape in which the protruding amount to the +Z direction side is reduced from that in the reference state is formed, and the conveyance path of the sheet S becomes shorter than that in the reference state.

As described above, the skew correction unit 50 includes the first belt member 53 and the second belt member 54 that are respectively disposed on one side and the other side with respect to the conveyance path T in the direction (the Z-axis direction) orthogonal to the conveyance direction F of the sheet S and support the sheet S across the surfaces on both sides. Then, by rotating the swing unit 58 according to the skewed amount of the sheet S to change the support surface shapes of the first belt member 53 and the second belt member 54, the relative length of the conveyance path between the region on the −X direction side and the region on the +X direction side of the sheet S is changed to correct the skew feeding of the sheet S.

Since the skew correction unit 50 conveys the sheet S while holding both side surfaces of the sheet S by the first belt member 53 and the second belt member 54 which are guide members, the followability of the sheet S to the displacement of the first belt member 53 and the second belt member 54 is excellent at the time of the skew feeding correction, and the positional deviation of the sheet S can be prevented to improve the accuracy of the skew feeding correction.

In a case where the first belt member 53 turns between the upstream rollers 55 and the downstream rollers 56 in the lower guide unit 51, the guide rollers 63 rotate following the first belt member 53, so that the first belt member 53 can be smoothly operated. Therefore, it is preferable to displace the first belt member 53 via the guide rollers 63 at the time of skew feeding correction. However, it is also possible to displace the first belt member 53 by bringing a rod-like member such as the shaft member 62 into contact without the guide rollers 63.

Each of the embodiments described above is an example applied to a sheet conveyance device provided in an image forming device, and by applying to sheet conveyance in the image forming device, skew feeding of a sheet can be corrected with high accuracy by a small structure, and quality of an image to be formed can be improved. However, the sheet conveyance device according to the present invention is applicable to any device other than the image forming device as long as the device conveys a sheet regardless of the type and use of the sheet. For example, it is possible to apply to a case where skew feeding of a sheet is corrected and the sheet is conveyed to a position of a processing tool in a processing device that performs processing such as cutting on the sheet. In a case where the sheet is conveyed in a state of being skewed with respect to the processing tool, a processing position of the sheet by the processing tool is displaced with respect to a preset processing position. Therefore, the sheet conveyance device of the present invention is useful for preventing positional displacement of the sheet due to skew feeding.

The skew detector that detects the skewed amount of the sheet with respect to the conveyance direction is not limited to the photosensor such as the skewed amount detection sensor 17 of the above embodiment. For example, an ultrasonic sensor or the like that detects passage of a sheet by oscillating an ultrasonic wave and receiving a reflected wave may be applied.

The present invention is not limited to the above-described embodiment as it is, and the constituent elements can be modified and embodied without departing from the gist thereof at the implementation stage. Furthermore, various inventions can be formed by appropriately combining a plurality of constituent elements disclosed in the embodiment. For example, all the constituent elements shown in the embodiment may be appropriately combined. It is a matter of course that various modifications and applications can be made without departing from the gist of the invention. Hereinafter, some inventions described in the specification and drawings of the present application will be additionally described.

According to an aspect, a sheet conveyance device comprises: a skew detector that detects a skewed amount with respect to a conveyance direction of a sheet to be conveyed; and a skew corrector that corrects skew feeding of the sheet, the skew corrector includes a guide member that supports the sheet along a width direction, and displaces the guide member so as to rotate a region in the width direction of the sheet supported by the guide member about an axis parallel to a conveyance direction according to a skewed amount of the sheet detected by the skew detector.

According to another aspect, the guide member slackens and supports the sheet in a direction orthogonal to the conveyance direction, and a conveyance path length is changed by relatively changing a slack amount on both sides of the sheet in a width direction by displacement of the guide member.

According to another aspect, the skew corrector includes a first support shaft and a second support shaft that are respectively disposed on one side and another side with respect to a conveyance path of the sheet in a direction orthogonal to a conveyance direction of the sheet and extend in a width direction of the sheet, and integrally rotates the first support shaft and the second support shaft about an axis parallel to the conveyance direction according to a skewed amount of the sheet, and the guide member includes a first guide member that operates following the first support shaft and a second guide member that operates following the second support shaft, and both side surfaces of the sheet are supported by the first guide member and the second guide member.

According to another aspect, the skew corrector comprises a plurality of the first guide members and a plurality of the second guide members disposed at intervals in a width direction of the sheet, a plurality of rotatable rollers located between the plurality of first guide members and the plurality of second guide members in the width direction of the sheet are supported by at least one of the first support shaft and the second support shaft.

According to another aspect, the guide member includes a first belt member and a second belt member that are respectively arranged on one side and another side with respect to a conveyance path of the sheet in a direction orthogonal to a conveyance direction of the sheet, and support the sheet by nipping both surfaces of the sheet, and the skew corrector changes a support surface shape of each of the first belt member and the second belt member according to a skewed amount of the sheet.

What is claimed is:

1. A sheet conveyance device comprising:

a skew detector that detects a skewed amount of a sheet to be conveyed with respect to a conveyance direction of the sheet to be conveyed; and a skew corrector that corrects skew feeding of the sheet, wherein the skew corrector includes a guide member that supports the sheet along a width direction, and displaces the guide member so as to rotate a region of the sheet in the width direction of the sheet supported by the guide member about an axis parallel to the conveyance direction according to the skewed amount of the sheet detected by the skew detector, the skew corrector includes a first support shaft and a second support shaft that are respectively disposed on one side and another side of the sheet with respect to a conveyance path of the sheet in a direction orthogonal to a conveyance direction of the sheet and extend in a width direction of the sheet, and integrally rotates the first support shaft and the second support shaft about the axis parallel to the conveyance direction according to the skewed amount of the sheet, the guide member includes a first guide member that operates to follow the first support shaft and a second guide member that operates to follow the second support shaft, and both side surfaces of the sheet are supported by the first guide member and the second guide member.

2. The sheet conveyance device according to claim 1, further comprising a plurality of the first guide members and a plurality of the second guide members disposed at intervals in a width direction of the sheet, wherein a plurality of rotatable rollers located between the plurality of the first guide members and the plurality of the second guide members in the width direction of the sheet are supported by at least one of the first support shaft and the second support shaft.

3. A sheet conveyance device comprising:

a skew detector that detects a skewed amount of a sheet to be conveyed with respect to a conveyance direction of the sheet to be conveyed; and a skew corrector that corrects skew feeding of the sheet, wherein the skew corrector includes a guide member that supports the sheet along a width direction, and displaces the guide member so as to rotate a region of the sheet in the width direction of the sheet supported by the guide member about an axis parallel to the conveyance direction according to the skewed amount of the sheet detected by the skew detector, wherein the guide member includes a first belt member and a second belt member that are respectively arranged on one side and another side of the sheet with respect to a conveyance path of the sheet in a direction orthogonal to a conveyance direction of the sheet, and support the sheet by nipping both surfaces of the sheet, and the skew corrector changes a support surface shape of each of the first belt member and the second belt member according to the skewed amount of the sheet.

* * * * *